(12) United States Patent
Patil et al.

(10) Patent No.: US 12,305,489 B2
(45) Date of Patent: May 20, 2025

(54) SURFACTANT FORMULATION AND METHOD FOR WATER FLOOD ASSISTED $CO_2$ SEQUESTRATION

(71) Applicant: SAUDI ARABIAN OIL COMPANY, Dhahran (SA)

(72) Inventors: Pramod Dhanaji Patil, Sugar Land, TX (US); Shiv S. Sangaru, Khobar (SA); Subhash C. Ayirala, Dhahran (SA); Ali A. Yousef, Dhahran (SA); Abdulaziz S. Qasim, Dammam (SA); Zuhair A. Al-Yousef, Saihat (SA); Muhammad M. Almajid, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 61 days.

(21) Appl. No.: 18/482,647

(22) Filed: Oct. 6, 2023

(65) Prior Publication Data
US 2025/0116173 A1    Apr. 10, 2025

(51) Int. Cl.
*E21B 41/00* (2006.01)
*C09K 8/584* (2006.01)
(Continued)

(52) U.S. Cl.
CPC .......... *E21B 41/0064* (2013.01); *C09K 8/584* (2013.01); *C09K 8/594* (2013.01); *E21B 43/16* (2013.01)

(58) Field of Classification Search
CPC ..... E21B 41/0064; E21B 43/16; C09K 8/584; C09K 8/594
See application file for complete search history.

(56) References Cited

U.S. PATENT DOCUMENTS

| 8,973,668 B2 | 3/2015 | Sanders et al. |
| 9,850,421 B2 | 12/2017 | Abbas et al. |

(Continued)

FOREIGN PATENT DOCUMENTS

CN    106590600 B    7/2019

OTHER PUBLICATIONS

Xue, Ziqiu, et al. "Microbubble Carbon Dioxide Injection for Enhanced Dissolution in Geological Sequestration and Improved Oil Recovery." Energy Procedia, vol. 63, 2014, pp. 7939-7946, https://doi.org/10.1016/j.egypro.2014.11.828 (Year: 2014).*
(Continued)

*Primary Examiner* — Crystal J Lee
(74) *Attorney, Agent, or Firm* — Osha Bergman Watanabe & Burton LLP

(57) ABSTRACT

A method for sequestering $CO_2$ in a subterranean formation and a method for sequestering $CO_2$ in a subterranean formation during an enhanced oil recovery treatment include preparing a solution comprising $CO_2$ and from 0.01% by weight (wt. %) to 10 wt. % of a $CO_2$ soluble alkoxylate surfactant based on the total weight of $CO_2$, processing the solution through a dispersing unit in fluid communication with an injection well, and injecting the dispersion into the injection well of the formation, thereby sequestering $CO_2$ in the formation. The method for sequestering $CO_2$ in a subterranean formation during an enhanced oil recovery treatment includes introducing an enhanced oil recovery treatment to the formation. A system for sequestering $CO_2$ in a formation includes an injection well in fluid communication with a formation, an injection unit, and a dispersing unit that is in fluid communication with the injection unit and the injection well.

20 Claims, 1 Drawing Sheet

(51) Int. Cl.
  *C09K 8/594* (2006.01)
  *E21B 43/16* (2006.01)

(56) References Cited

U.S. PATENT DOCUMENTS

| | | |
|---|---|---|
| 9,874,079 B2 | 1/2018 | Sanders et al. |
| 10,662,370 B2 | 5/2020 | Grzesiak et al. |
| 2013/0319230 A1 | 12/2013 | Patel |
| 2016/0230062 A1* | 8/2016 | Beuterbaugh ......... E21B 43/164 |
| 2022/0025247 A1 | 1/2022 | Weerasooriya et al. |
| 2022/0145163 A1 | 5/2022 | Katiyar et al. |
| 2022/0154067 A1 | 5/2022 | Okuno et al. |

OTHER PUBLICATIONS

Koide el. "Carbon microbubbles sequestration: A novel technology for stable underground emplacement of greenhouse gases into wide variety of saline aquifers, fractured rocks and tight reservoirs." Energy Procedia, vol. 1, No. 1, Feb. 2009, pp. 3655-3662, https://doi.org/10.1016/j.egypro.2009.02.162 (Year: 2009).*

Koide, Hitoshi (Gene) et al., "Carbon microbubbles sequestration: a novel technology for stable underground emplacement of greenhouse gases into wide variety of saline aquifers, fractured rocks and tight reservoirs"; Energy Procedia; vol. 1, Issue 1; pp. 3655-3662; Feb. 2009 (8 pages).

Xue, Ziqiu et al., "Microbubble carbon dioxide injection for enhanced dissolution in geological sequestration and improved oil recovery"; Energy Procedia; vol. 63; pp. 7939-7946; 2014 (8 pages).

* cited by examiner

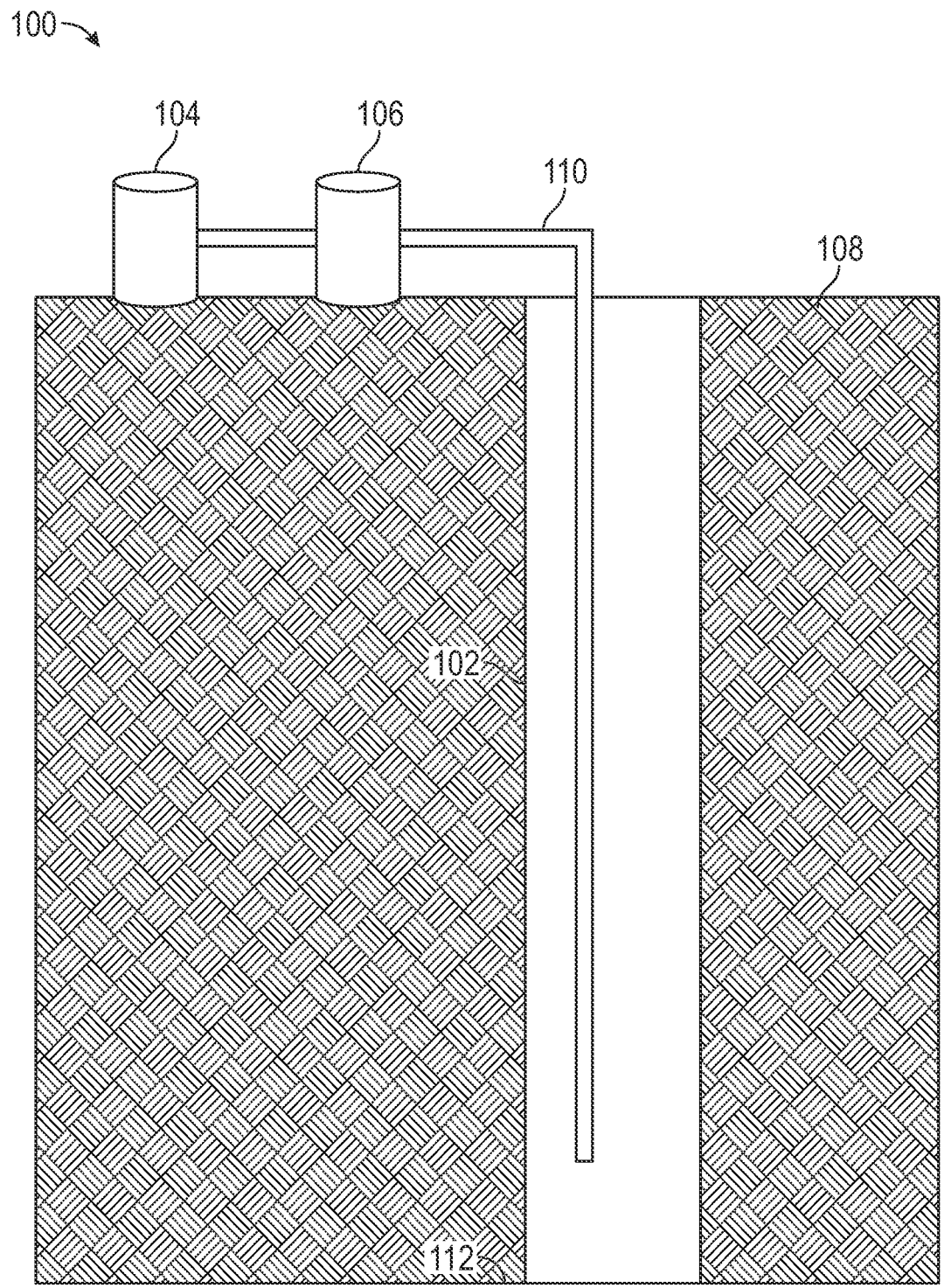

SURFACTANT FORMULATION AND METHOD FOR WATER FLOOD ASSISTED $CO_2$ SEQUESTRATION

BACKGROUND

Carbon dioxide ($CO_2$) is a naturally occurring compound that is present in Earth's atmosphere. The $CO_2$ in the atmosphere may be derived from natural sources, such as respiration, or from human activities, such as the combustion of fossil fuels, heating and cooling operations, power generation, transportation, and other industrial operations. The environmental effects of $CO_2$ in the atmosphere are of particular concern because $CO_2$ is a "greenhouse gas". A greenhouse gas can absorb light and radiate heat instead of reflecting it, elevating the temperature of the gas. In efforts to slow the rate of global warming, carbon capture and storage (CCS) has emerged as a possible solution for reducing $CO_2$ in the atmosphere. In a typical CCS process, atmospheric $CO_2$ is captured, compressed, and utilized with the eventual goal of long-term storage in underground geological formations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for sequestering $CO_2$ in a subterranean formation, which may include preparing a solution comprising $CO_2$ and from 0.01% by weight (wt. %) to 10 wt. % of a $CO_2$ soluble alkoxylate surfactant based on the total weight of $CO_2$. The method may also include processing the solution through a dispersing unit in fluid communication with an injection well, thereby forming a dispersion comprising $CO_2$ microbubbles and $CO_2$ nanobubbles dispersed in an aqueous fluid. The volume fraction of $CO_2$ may be in a range from 10 vol % or less based on the total volume of the dispersion. The method may also include injecting the dispersion into the injection well of the formation, thereby sequestering $CO_2$ in the formation.

In another aspect, embodiments disclosed herein relate to a method for sequestering $CO_2$ in a subterranean formation during an enhanced oil recovery treatment. The method may include introducing an enhanced oil recovery treatment to the formation, preparing a solution comprising $CO_2$ and from 0.01% by weight (wt. %) to 10 wt. % of a $CO_2$ soluble alkoxylate surfactant based on the total weight of $CO_2$, a mixture comprising 10 vol % or less of $CO_2$, from 0.01 wt. % to 10 wt. % of a $CO_2$ soluble alkoxylate surfactant based on the total weight of $CO_2$, and an aqueous carrier fluid, or both, and processing the solution, the mixture, or both through a dispersing unit, thereby forming a dispersion comprising $CO_2$ microbubbles and $CO_2$ nanobubbles dispersed in the aqueous fluid. The method may also include injecting the dispersion into an injection well of the formation, thereby sequestering $CO_2$ in the formation during the enhanced oil recovery treatment.

In another aspect, embodiments disclosed herein relate to a system for sequestering $CO_2$ in a formation. The system may include an injection well in fluid communication with a formation, an injection unit configured to provide a solution comprising $CO_2$ and from 0.01% by weight (wt. %) to 10 wt. % of a $CO_2$ soluble alkoxylate surfactant based on the total weight of $CO_2$, a mixture comprising 10 vol % or less of $CO_2$, from 0.01 wt. % to 10 wt. % of the $CO_2$ soluble alkoxylate surfactant based on the total weight of $CO_2$, and an aqueous carrier fluid, or both. The system may include a dispersing unit configured to form a dispersion comprising microbubbles, nanobubbles, or both from the mixture. The dispersing unit may be in fluid communication with the injection unit and the injection well.

Other aspects and advantages of the claimed subject matter will be apparent from the following description and the appended claims.

BRIEF DESCRIPTION OF DRAWINGS

The FIGURE is a system for sequestering $CO_2$ in accordance with one or more embodiments.

DETAILED DESCRIPTION

In conventional oil recovery processes, $CO_2$ is injected in a wellbore to enter and sweep areas of the formation (e.g., pores and cracks in the rocks of the formation) to dissolve hydrocarbons and improve hydrocarbon recovery. Water-flooding is then performed to further sweep the residual $CO_2$-hydrocarbon mixture from the formation. Thus, in conventional oil recovery processes, injected $CO_2$ and water mix in porous rock and cracks of the formation. In such processes, there are limited shear forces or mechanisms available to promote $CO_2$ sequestration in the rock. In traditional enhanced oil recovery techniques, a $CO_2$ volume fraction is generally included in the range from about 30% to 95% or more.

Embodiments disclosed herein relate to the use of microbubbles and nanobubbles of $CO_2$, in which the $CO_2$ volume fraction is significantly decreased as compared to conventional enhanced oil recovery techniques. In one or more embodiments herein, an aqueous carrier fluid and a low volume fraction $CO_2$ may be injected into a reservoir, which allows for the sequestration of a significant amount of $CO_2$ in the reservoir. In such embodiments, there may be a marginal or minimal impact on the production of hydrocarbons from the reservoir due to the $CO_2$ microbubbles and $CO_2$ nanobubbles present in the aqueous carrier fluid.

Embodiments herein relate to a system and method for passively sequestering $CO_2$ in a subterranean formation. This passive $CO_2$ sequestration is performed with aqueous fluid injection, in which $CO_2$ is transported from the surface to a subterranean location, in which it may naturally be solubilized. In some embodiments, an additional low volume fraction amount of $CO_2$ is added to the aqueous fluid in the form of micro- or nanobubbles that can be transported to sequester $CO_2$ in the formation with a potential secondary benefit as an oil recovery enhancement. In one or more embodiments, an aqueous carrier fluid is the continuous phase, and a $CO_2$ soluble surfactant assists in dispersing $CO_2$ throughout the carrier fluid in the form of bubbles having average diameters in the micron or nanometer range.

The system and method may include the use of a mixture of a $CO_2$ soluble surfactant, $CO_2$, and an aqueous carrier fluid. Unlike surfactants that enable foam formation in a high $CO_2$ volume fraction emulsion, the $CO_2$ soluble surfactant of the present disclosure decreases the interfacial tension (IFT) of the aqueous carrier fluid and the $CO_2$ to form a stable dispersion. The surfactant enables the generation of a larger surface area to volume ratio of $CO_2$ as well as the number density of $CO_2$ microbubbles, nanobubbles, or both dispersed in water as compared to mixtures or dispersions without the surfactant.

The system and method may enable efficient $CO_2$ sequestration in a reservoir while simultaneously undergoing a water flood treatment, thereby lowering the overall carbon footprint of the reservoir and contributing to carbon neutrality (or a circular carbon economy). The system and method of one or more embodiments may increase the efficiency of $CO_2$ sequestration and storage in saline aquifers.

System for Sequestering $Co_2$ in a Formation

In one aspect, embodiments herein relate to a system 100 for sequestering $CO_2$ in a subterranean location 112 of a formation 102. The formation 102 may include one or more types of rock selected from carbonate, sandstone, shale, anhydrite, basalt, among others throughout the subterranean location 112. The formation 102 may be hydrocarbon bearing reservoir that is undergoing a waterflooding treatment stage of hydrocarbon recovery. The formation 102 of one or more embodiments is an aquifer, which is a formation that includes natural brine in a subterranean location 112. Aquifers may include any sedimentary layers with brines containing high concentrations of dissolved salts, making them unsuitable for use as drinking water sources as the average amount of total dissolved solids in aquifers exceeds about 10,000 mg/L (milligrams per Liter). In embodiments where the formation is an aquifer, a portion of a native formation fluid can be produced to the surface to maintain pressure of the formation, directed away from the injection system, processed and converted to a freshwater source, or combinations thereof.

The system 100 may include an injection well 102 extending into a formation 108. The system 100 may include an injection unit 104 in fluid communication with the injection well 102, and a dispersing unit 106 in fluid communication with the injection well 102 and the injection unit 104. The injection unit 104 and the dispersing unit may be in fluid communication with the injection well 102 via fluid line 110. In some embodiments, fluid line 110 is a production tubing, such as coiled tubing.

The dispersing unit 106 may be configured to form a micro-nano dispersion from a solution of a $CO_2$ soluble surfactant dissolved in $CO_2$ and an aqueous carrier fluid stream. Thus, the dispersing unit 106 may form a micro-nano dispersion including $CO_2$, a $CO_2$ soluble surfactant, and an aqueous carrier fluid. The micro-nano dispersion may be stabilized by the $CO_2$ soluble surfactant, which occupies the interface between the bubbles of $CO_2$ and the aqueous carrier fluid. The micro-nano dispersion of one or more embodiments may be configured to assist in trapping $CO_2$ into formation pores as residual trapped gas. The micro-nano dispersion may enhance residual trapping, dissolution trapping through a relatively large surface area as compared to a composition without the $CO_2$ soluble surfactant, ionization trapping of $CO_2$ in saline aquifer storage, or combinations thereof.

The term "micro-nano dispersion" refers to a dispersion formed in the presence of the $CO_2$ soluble surfactant in which $CO_2$ microbubbles and $CO_2$ nanobubbles are present in an aqueous carrier fluid. The term "$CO_2$ microbubbles" refers to bubbles of $CO_2$ in an aqueous carrier fluid having an average diameter size in the range from 1 micrometer ($\mu$m) to 1 millimeter (mm). The term "$CO_2$ nanobubbles" refers to bubbles of $CO_2$ in an aqueous carrier fluid having an average diameter size in the range from 1 nanometer (nm) to 999 nm. The term "bubble" refers to a sphere of liquid or gas surrounded by another liquid or gas, having an interfacial layer between the liquid or gas inside the bubble and the surrounding liquid or gas.

The dispersing unit 106 may be a high shear mixer, such as rotor-stator mixer, that can achieve a shear rate sufficient to form the micro-nano dispersion in which the $CO_2$ soluble surfactant occupies an aqueous fluid-$CO_2$ interface. The dispersing unit 106 may include a high shear mixer at the surface of the formation configured to generate the micro-nano dispersion for injection into the formation. The dispersing unit 106 may be configured to perform mechanical mixing, electrostriction, generate infrasonic frequencies, acoustic frequencies, ultrasonic frequencies, or combinations thereof. The term "electrostriction" refers to the mechanical displacement of materials in response to an electric field. In some embodiments, the dispersing unit 106 includes electrostriction equipment, such as a commercially available nanobubble generator that is capable of preparing the micro-nano dispersion that may obtained from AquaB Limited (Dublin, Ireland), NanobOx, or both. In some embodiments, the nanobubble generator may be an internal generator or a standalone generator. The internal generator may be a submersible generator. The standalone generator may be a continuous flow generator. The micro-nano dispersion may be prepared for field scale applications at an off-site (e.g., a laboratory) or on-site location.

In embodiments where the dispersing unit 106 is configured to generate infrasonic frequencies, acoustic frequencies, ultrasonic frequencies, or combinations thereof, the dispersing unit 106 is located at the surface of the formation as shown in the FIGURE. In particular embodiments, the dispersing unit 106 may be a high shear mixer, an infrasonic unit, an acoustic unit, an ultrasonic unit, or combinations thereof.

In some embodiments, the dispersing unit is a subsurface or inline mixer located in a tubing (e.g., a coiled tubing) such that the micro-nano dispersion is formed at a downhole location in the wellbore of the injection well and transported further downhole to be sequestered in the formation. In one or more embodiments, the solution including the $CO_2$ soluble surfactant dissolved in $CO_2$ can be injected via a coiled tubing or production tubing into the well bore and delivered 1 ft (foot) to 100 ft or more above the perforations of the wellbore and passed through the center of a dispersing unit that forms a micro-nano dispersion with an aqueous fluid flowing in concentric areas of the tubing. In particular embodiments, the dispersing unit may be a rotor-stator mixer located in a coiled tubing that is provided in a wellbore. In such instances, a $CO_2$ fluid including the $CO_2$ soluble surfactant may be provided to the coiled tubing from the injection unit. The dispersing unit may be configured to disperse microbubbles and nanobubbles from the $CO_2$ fluid including the $CO_2$ soluble surfactant into an aqueous carrier fluid flowing through the co-centric section of the wellbore.

The injection unit may be in fluid communication with the injection well such that one or more materials from the surface can be transported to from the injection unit to a downhole location. The injection unit may include one or more fluid lines, a mixing chamber, among other components configured to receive materials for injection downhole. The injection unit may be configured to provide a mixture of an aqueous carrier fluid, a $CO_2$ soluble surfactant, and $CO_2$. The injection unit may be configured to provide a solution of a $CO_2$ soluble surfactant dissolved in $CO_2$, a separate aqueous fluid stream, or both to a dispersing unit. An injection system may mix a volume of $CO_2$ with a volume of an aqueous fluid. The injection unit may include additional modules, sensors, and/or systems as known by one skilled in the art. For example, the injection unit may include a fluid property sensor. The fluid property sensor may transmit a fluid property, such as density, pH, rheology, volume, weight, flow, among other properties, to a user device. As such, a solution mixing manager or another control system may receive sensor data from various mixture sensors regarding various mixture property parameters. In addition, sensor data may refer to both raw sensor measurements and/or processed sensor data associated with one or more mixture properties.

As noted above, the mixture described herein includes an aqueous carrier fluid, a $CO_2$ soluble surfactant, and $CO_2$. The $CO_2$ may be in the form of a supercritical fluid, a gas, or both. The mixture, the micro-nano dispersion, or both may include $CO_2$ in an amount of 20 volume percent (vol %) or less of $CO_2$ based on the total volume of the mixture. In some embodiments, the mixture includes 10 vol % or less based on the total volume of the mixture, 5 vol % or less based on the total volume of the mixture, 2.5 vol % or less based on the total volume of the mixture, or 1 vol % or less based on the total volume of the mixture. In some embodiments, $CO_2$ may be present in the mixture in an amount ranging from 0.01 vol % to 20 vol % based on the total volume of the mixture. The mixture may include $CO_2$ in an amount having a lower limit of any one of 0.01, 0.05, 0.10, 0.50, 1, 2.5, 5, 10, and 15 vol % and an upper limit of any one of 0.50, 1, 5, 7.5, 10, 15, and 20 vol %, where any lower limit may be paired with any mathematically compatible upper limit.

The $CO_2$ soluble surfactant may be configured to reduce the interfacial tension between $CO_2$ and an aqueous carrier fluid to such an extent that a micro-nano dispersion forms. In some embodiments, the $CO_2$ soluble surfactant is configured to increase the $CO_2$ volume fraction loading in the aqueous carrier fluid as compared to a dispersion without the $CO_2$ soluble surfactant. In one or more embodiments, the enhancement of the $CO_2$ volume fraction compared to a dispersion without the surfactant is enhanced by a factor in a range from 1.1 to 3, such as a 1.2, 1.5, 1.7, 2.0, 2.2, 2.5, 2.7 and 3.0 factor enhancement of the $CO_2$ volume fraction compared to a dispersion without the surfactant. For example, if a $CO_2$ volume fraction is 1 volume percent (vol %) for a dispersion without a $CO_2$ soluble surfactant, a dispersion of one or more embodiments can have a $CO_2$ volume fraction loading of 3 vol %.

The $CO_2$ soluble surfactant selected may be a $CO_2$ soluble non-ionic surfactant. The $CO_2$ soluble surfactant may be a $CO_2$ soluble alkoxylate surfactant, such as a $CO_2$ soluble ethoxylate surfactant. The $CO_2$ soluble surfactant of one or more embodiments has a general structure of R—(PO)x-(EO)y, where R is a hydrophobic alkyl group that may be linear or branched, PO is propylene oxide, and EO is ethylene oxide. In some embodiments, the carbon chain length of R ranges from 2 to 40 carbons. The carbon chain length may be in a range with a lower limit of any one of 2, 3, 4, 5, 7, 10, 15, 20, and 25 carbons and an upper limit of any one of 5, 7, 9, 10, 15, 20, 25, 30, and 40 carbons, where any lower limit can be paired with any mathematically compatible upper limit. The number of propylene oxide units (x) can range from 1 to 50 units. The number of propylene oxide units (x) may be in a range with a lower limit of any one of 1, 2, 3, 4, 5, 7, 10, 15, 20, and 25 polyethylene units and an upper limit of any one of 5, 7, 9, 10, 15, 20, 25, 30, 40, and 50 polyethylene units, where any lower limit can be paired with any mathematically compatible upper limit. The number of ethylene oxide units (x) can range from 1 to 50 units. The number of ethylene oxide units (y) may be in a range with a lower limit of any one of 1, 2, 3, 4, 5, 7, 10, 15, 20, and 25 ethylene oxide units and an upper limit of any one of 5, 7, 9, 10, 15, 20, 25, 30, 40, and 50 ethylene oxide units, where any lower limit can be paired with any mathematically compatible upper limit. In some embodiments, the $CO_2$ soluble surfactant includes an additive selected from a product labelled under the Elevate™ Foaming Additives line (Dow, Inc., Midland, Michigan), a surfactant labelled under the Lutensol® line from BASF (Ludwigshafen, Germany).

The $CO_2$ soluble surfactant may be in a range from 0.01% by weight (wt. %) to 20 wt. %, from 0.1 wt. % to 10 wt. %, from 0.1 wt. % to 1 wt. %, or from 0.1 wt. % to 0.5 wt. % based on the total weight of $CO_2$. The mixture may include $CO_2$ in an amount having a lower limit of any one of 0.01, 0.05, 0.10, 0.50, 1, 2.5, 5, 10, and 15 wt. % and an upper limit of any one of 0.50, 1, 5, 7.5, 10, 15, and 20 wt. % based on the total weight of $CO_2$, where any lower limit may be paired with any mathematically compatible upper limit.

The aqueous carrier fluid of one or more embodiments is provided to transport a micro-nano $CO_2$ dispersion to a subterranean location of the formation such that $CO_2$ may be sequestered. The aqueous carrier fluid includes water. The water may be distilled water, deionized water, tap water, fresh water from surface or subsurface sources, production water, formation water, natural water produced from an aquifer, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the aqueous carrier fluid may naturally contain contaminants, such as salts, ions, minerals, organics, and combinations thereof, as long as the contaminants do not interfere with the formation of a micro-nano $CO_2$ dispersion.

In some embodiments, the aqueous carrier fluid can be a high salinity injection water (e.g., seawater) or low salinity injection water (e.g., freshwater). The aqueous carrier fluid can have a total dissolved salts concentration ranging from 5,000 ppm to 200,000 ppm. In some embodiments, the aqueous carrier fluid has a total dissolved solids concentration in the range of 2000 ppm to 50,000 ppm The concentration of specific aqueous ions, such as sodium and sulfates, can range from 2,000 ppm (parts per million) to 30,000 ppm and from 300 ppm to 4,000 ppm, respectively.

Method for Sequestering $Co_2$ in a Subterranean Formation

In another aspect, embodiments herein relate to a method for sequestering $CO_2$ in a subterranean formation. The method may include providing a system for sequestering $CO_2$ as described above including installing one or more units of the system in a coiled tubing of an injection well (e.g., in a wellbore), at a surface location, or combinations thereof.

In some embodiments, the method includes preparing a $CO_2$ solution that includes a $CO_2$ soluble surfactant dissolved in $CO_2$. The method may include adding an aqueous carrier fluid to the $CO_2$ solution to form a $CO_2$ mixture. In such embodiments, adding the aqueous carrier fluid may be performed at a surface location of the formation, in a downhole location such as via injection of an aqueous fluid to the dispersing unit, or both. The method of one or more embodiments may include preparing a mixture of a $CO_2$ solution and an aqueous carrier fluid. The $CO_2$, $CO_2$ soluble surfactant, and aqueous carrier fluid may be as described above.

The method may include processing the $CO_2$ solution, the $CO_2$ mixture, or both through a dispersing unit, thereby forming a micro-nano dispersion that includes $CO_2$ microbubbles and $CO_2$ nanobubbles dispersed in the aqueous carrier fluid. The dispersing unit may use a mechanical force, an electrostriction technique, or both to generate local cavitation, which promotes formation of the microbubbles and nanobubbles of the dispersion. The injection pressure of the $CO_2$ solution, the aqueous carrier fluid, the dispersing unit, or any combination thereof can be in the range of 50 psi (pounds per square inch) to 2000 psi. In one or more particular embodiments, the injection pressure may be in the range of 100 psi to 1000 psi. The temperature of the dispersing unit can be in the range from 20° C. to 100° C. In some embodiments, the temperature of the dispersing unit is in the range from 25° C. to 50° C.

In embodiments in which the $CO_2$ solution is processed through the dispersing unit, an aqueous carrier fluid may be co-injected to form the micro-nano dispersion. The dispersing unit may be located at a surface location, in a tubing located in the injection well such that the dispersing unit is at a downhole location, or both. In some embodiments, the $CO_2$ soluble surfactant and $CO_2$ are processed with the aqueous fluid with the dispersing unit in single or multiple cycles to form the micro-nano dispersion of $CO_2$ in the aqueous carrier fluid.

The $CO_2$ soluble surfactant may reduce interfacial tension (IFT) by occupying an interface between the microbubbles and nanobubbles of $CO_2$ and the surrounding aqueous carrier fluid by a factor in a range from 1.1 to 100, thereby stabilizing the dispersion. In some embodiments, the $CO_2$ soluble surfactant decreases the IFT by occupying an interface between the microbubbles and nanobubbles of $CO_2$ and the surrounding aqueous carrier fluid by a factor in a range from 1.5 to 10, thereby stabilizing the dispersion. Typically, with the surfactant of one or more embodiments, the IFT between $CO_2$ and water can be reduced by about 30% to about 70%. In some embodiments, the IFT is reduced by increasing temperature and with the surfactant as described above. As one of ordinary skill may appreciate, the IFT between $CO_2$ and the aqueous carrier fluid can be measured using the sessile drop method.

The $CO_2$ soluble surfactant promotes the formation of a higher number density of $CO_2$ microbubbles and $CO_2$ nanobubbles in the dispersion as compared to a dispersion without the $CO_2$ soluble surfactant because the surfactant reduces IFT that enables a "pinch off" or "snap off" mechanism. The number density of the micro-nano dispersion refers to the quantity of microbubbles and nanobubbles formed per unit volume of aqueous carrier fluid. In the "pinch off" or "snap off" mechanism, the surfactant rapidly occupies the surface of the $CO_2$ bubble upon formation and provides the $CO_2$-aqueous fluid interface lower surface energy. For example, with the same external mechanical force or electrical energy, an increased number of bubbles may be formed to increase the overall surface area of the dispersion.

In some embodiments, the microbubbles and the nanobubbles are metastable, meaning that the pressure inside the bubble is significantly higher as compared to the pressure surrounding the bubble. As such, one would necessarily have to apply much a much larger pressure than the internal pressure of the bubble to break the microbubble and/or nanobubble. When the $CO_2$ microbubbles and $CO_2$ nanobubbles travel through the wellbore of a reservoir or a formation, there may be a significant phase change, which may cause some breakage of microbubbles. However, nanobubbles of one or more embodiments have a greater stability to withstand this phase change under down hole pressure. As such, the micro-nano dispersion is significantly more stable than a dispersion without the $CO_2$ soluble surfactant.

In some embodiments, the micro-nano dispersion may be formed at the surface of the formation. In such embodiments, the injection unit of the system for sequestering $CO_2$ may prepare the mixture including $CO_2$, a $CO_2$ soluble surfactant, and the aqueous carrier fluid. The mixture may be fed from the injection unit to the dispersing unit to form the micro-nano dispersion. The micro-nano dispersion may be injected from the dispersing unit at the surface to a subterranean location via the injection well. The method of one or more embodiments is performed while the formation is undergoing water flood treatment for hydrocarbon recovery. The method may be performed in a formation that is toward the end of a water flood cycle. In such embodiments, the hydrocarbon recovery from the formation is controlled by the water flood treatment. The injection of the micro-nano dispersion may not impact on hydrocarbon recovery during the water flood treatment. In some embodiments, hydrocarbon recovery is improved as a result of the injection of supercritical $CO_2$ in the reservoir.

In some embodiments, the micro-nano dispersion is formed downhole. In such embodiments, the method may include providing a dispersing unit in a coiled tubing, which may be provided in the wellbore of the injection well. In such embodiments, the method includes preparing a solution of a $CO_2$ soluble surfactant dissolved in $CO_2$ in the injection unit. The injection unit may inject the solution downhole to the dispersing unit via the coiled tubing. The dispersing unit may form the micro-nano dispersion by agitating or mixing the solution with an aqueous carrier fluid stream that may be transported to the dispersing unit through the concentric region of the coiled tubing, thereby forming the micro-nano dispersion in the wellbore.

In some embodiments, the micro-nano dispersion is injected to the formation in more than one cycle (e.g., several cycles). The micro-nano dispersion may be injected into the formation via multiple injection wells. The injection wells may be vertical, horizontal, or multi-lateral wells. In such embodiments, each injection well may be equipped with an injection unit, a dispersing unit, or both to facilitate the injection of a micro-nano dispersion to the formation via the multiple injection wells.

In some embodiments, the method for sequestering $CO_2$ is implemented in on-shore or off-shore hydrocarbon bearing formations. In such embodiments, the method includes introducing an enhanced oil recovery treatment, such as a waterflooding treatment, to a hydrocarbon bearing formation prior to injecting the micro-nano dispersion to the formation.

In some embodiments, the method for sequestering $CO_2$ is implemented in on-shore or off-shore formations that have an aquifer in the subterranean location. In embodiments where $CO_2$ sequestration is performed in an aquifer, the method may include maintaining formation pressure by producing the natural brine from the aquifer. In such embodiments, the produced brine may be reinjected to accommodate the $CO_2$ volume dissolved in the formation without overly increasing the pressure of the formation. The injected micro-nano dispersion may provide higher loading of $CO_2$ to the formation in the form of microbubbles, nanobubbles, or both, which can increase the rate of $CO_2$ sequestration due to faster dissolution of $CO_2$ in the natural brine. The dissolution of $CO_2$ from the micro-nano dispersion may be enabled by the large surface area to volume ratio present in the micro-nano dispersion. The micro-nano dispersion may promote the solubility of $CO_2$ from the bubbles of the dispersion in the injected water as well as natural brine. In some embodiments, the natural brine water surrounding the injection well can be enriched with $CO_2$ over the period of time, thereby increasing the rate of a solubilized $CO_2$ plume in the formation.

In some embodiments, the buoyancy of the $CO_2$ microbubbles and $CO_2$ nanobubbles in the dispersion is decreased relative to a pure supercritical $CO_2$ fluid injected into the reservoir. As such, there is a significant reduction in the gravity segregation of the injected micro-nano bubble dispersion as compared to supercritical $CO_2$. Due to the high surface area to volume ratio of the bubbles of the micro-nano dispersion, $CO_2$ microbubbles and $CO_2$ nanobubbles can quickly dissolve into a natural formation fluid, formation fluid that includes aqueous fluids injected into the formation, or both as the subsurface pressure increases. As the micro-nano dispersion may have a greater density than a natural formation fluid or primary groundwater, the micro-nano dispersion may have a tendency to settle or flow to the bottom of the formation at which point, the increased pressure can promote dissolution of $CO_2$ of the dispersion.

The $CO_2$ soluble surfactant of one or more embodiments has a decreased adsorption affinity to carbonate rock. In some embodiments, adsorption of the $CO_2$ soluble surfactant on rock present in a formation is decreased due to relatively low surfactant concentrations as compared to formation treatment fluids with higher concentrations of a surfactant. The $CO_2$ soluble surfactant of one or more embodiments may be non-ionic as described above. In some embodiments, the $CO_2$ soluble surfactant does not have hydrogen-bonding ability with a carbonate rock. In some embodiments, the oxygen of the ethylene oxide end group of the surfactant can form a weak hydrogen bond with a hydroxyl group on the carbonate surface. As a result, the surfactant may have minimal adsorption on a surface of the carbonate rock. For example, the surfactant of one or more embodiments may undergo physisorption, which is a phenomenon in which a weak bond is formed with a carbonate rock such that only a monolayer of surfactant may adsorb. Therefore, a very low concentration of surfactant of one or more embodiments may adsorb onto a carbonate rock of the reservoir.

The surfactant may be used for $CO_2$ sequestration in formations that include sandstone, unconventional shale rocks, or both. In such embodiments, an operator needs to account for the effects of surfactant adsorption on the stability of the micro-nano dispersion. For example, in the case of high surfactant adsorption, the micro-nano bubble will rapidly become unstable in the presence of carbonate rock and $CO_2$ will be prematurely liberated in the subsurface, thereby decreasing the amount of $CO_2$ sequestered in the formation. In some embodiments, the micro-nano dispersion formulation is optimized such that the $CO_2$ soluble surfactant adsorption to a rock surface of a formation is minimized. The optimized micro-nano dispersion may include the $CO_2$ soluble surfactant with a co-surfactant. In some embodiments, the concentration of the $CO_2$ soluble surfactant, the co-surfactant, or both is adjusted. The co-surfactant may be one or more additional surfactants selected from a $CO_2$ soluble surfactant as described above or nonionic surfactants, anionic surfactants, cationic surfactants, and zwitterionic surfactants known in the art. In some embodiments, the $CO_2$ soluble surfactant of one or more embodiments may have a low adsorption on rock present in the formation due to an overall neutral charge of the surfactant, relatively low concentration of the $CO_2$ soluble surfactant, or both.

In one or more embodiments, the $CO_2$ soluble surfactant reduces the capillary pressure of dispersion as compared to a dispersion without the $CO_2$ soluble surfactant. The reduced capillary pressure can allow the $CO_2$ of the microbubbles and nanobubbles to enter and occupy small capillaries, which, in turn, can improve $CO_2$ trapping into smaller pores and cracks of the formation to sequester $CO_2$ permanently with capillary trapping and residual trapping. Interfacial force and capillary effect may assist in trapping $CO_2$ of the micro-nano dispersion in pores and cracks of rocks as residual gas. The micro-nano dispersion may enhance residual trapping (e.g., via interfacial and capillary effects), dissolution trapping as a result of a high surface area to volume ratio, and ionization trapping of $CO_2$ in stable saline aquifers.

Embodiments of the present disclosure may provide at least one of the following advantages. As one of ordinary skill may appreciate, the method and system of one or more embodiments can be optimized to significantly lower the carbon footprint of waterflooding treatments and contribute towards achieving carbon neutrality. The $CO_2$ soluble surfactant may significantly lower the IFT between $CO_2$ and an aqueous carrier fluid to reduce the energy necessary to produce a dispersion and can promote a relatively higher number density of bubbles within the dispersion.

The micro-nano dispersion laden with surfactant modules can provide better stability for the micro-nano dispersion to be transported to tighter pores for permanent trapping of $CO_2$. As a result of the larger surface area to volume ratio of the bubbles of the micro-nano dispersion, significant $CO_2$ trapping is expected in residual oil saturation zone (e.g., zones with residual hydrocarbons) as well as swept zones (e.g., zones with negligible hydrocarbons remaining). The gravity override of the formation and segregation of fluids will severely be reduced for broader sequestration of $CO_2$ in the subsurface porous media.

Although not the intended effect, hydrocarbon recovery may be improved due to the injected micro-nano dispersion. The acidic nature of the carbonic acid formed due to dissolution of $CO_2$ microbubbles and $CO_2$ nanobubbles in brine and the reduced IFT, pores of the formation may be better swept as compared to waterflooding treatments without the injection of a micro-nano dispersion. When applied for improved recovery, the $CO_2$ soluble surfactant may be formulated to have relatively low ester-based linker molecules (e.g., less than 5 mol %) that have lower thermal stability. Therefore, under downhole conditions, thermal degradation (e.g., hydrolysis) of these ester linker molecules may be initiated, thereby destabilizing the micro-nano dispersion and promoting an accelerated release of $CO_2$ release to assist with hydrocarbon recovery.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for sequestering $CO_2$ in a subterranean formation, the method comprising:
   preparing a solution comprising $CO_2$ and from 0.01% by weight (wt. %) to 10 wt. % of a $CO_2$ soluble alkoxylate surfactant based on the total weight of $CO_2$;

processing the solution through a dispersing unit in fluid communication with an injection well, thereby forming a dispersion comprising $CO_2$ microbubbles and $CO_2$ nanobubbles dispersed in an aqueous fluid, wherein a volume fraction of $CO_2$ is in a range from 10 vol % or less based on the total volume of the dispersion; and injecting the dispersion into the injection well of the formation, thereby sequestering $CO_2$ in the formation.

2. The method of claim 1, further comprising adding the aqueous fluid to the solution to form a $CO_2$ mixture.

3. The method of claim 1, wherein the dispersing unit is in fluid communication with coiled tubing such that processing a mixture of the solution and the aqueous fluid occurs in a downhole location of the injection well.

4. The method of claim 1, further comprising injecting the aqueous fluid to the dispersing unit.

5. The method of claim 1, further comprising:
dissolving the microbubbles and the nanobubbles of the dispersion in a formation fluid, thereby increasing a concentration of $CO_2$ in the formation fluid.

6. The method of claim 1, wherein the $CO_2$ soluble alkoxylate surfactant is a non-ionic alkoxylate surfactant, and wherein the $CO_2$ soluble alkoxylate surfactant has a general structure of R—(PO)x-(EO)y, where R is a linear or branched hydrocarbon chain having from 4 to 30 carbons, PO is propylene oxide, EO is ethylene oxide, x is in a range from 1 to 50, and y is in a range from 1 to 50.

7. The method of claim 1, wherein the $CO_2$ soluble alkoxylate surfactant is present in the dispersion in a range from 0.1 wt. % to 1 wt. % based on the total weight of $CO_2$.

8. The method of claim 1, wherein the dispersing unit is a high shear mixer, an infrasonic unit, an acoustic unit, an ultrasonic unit, or combinations thereof.

9. The method of claim 1, wherein the dispersing unit is located at a surface location of the formation.

10. A method for sequestering $CO_2$ in a subterranean formation during an enhanced oil recovery treatment, the method comprising:
introducing an enhanced oil recovery treatment to the formation;
preparing a solution comprising $CO_2$ and from 0.01% by weight (wt. %) to 10 wt. % of a $CO_2$ soluble alkoxylate surfactant based on the total weight of $CO_2$, a mixture comprising 10 vol % or less of $CO_2$, from 0.01 wt. % to 10 wt. % of a $CO_2$ soluble alkoxylate surfactant based on the total weight of $CO_2$, and an aqueous carrier fluid, or both;
processing the solution, the mixture, or both through a dispersing unit, thereby forming a dispersion comprising $CO_2$ microbubbles and $CO_2$ nanobubbles dispersed in the aqueous fluid; and
injecting the dispersion into an injection well of the formation, thereby sequestering $CO_2$ in the formation during the enhanced oil recovery treatment.

11. The method of claim 10, further comprising adding an aqueous carrier fluid to the solution to form a $CO_2$ mixture.

12. The method of claim 10, wherein the enhanced oil recovery treatment is a waterflooding treatment.

13. A system for sequestering $CO_2$ in a formation, the system comprising:
an injection well in fluid communication with a formation;
an injection unit configured to provide a solution comprising $CO_2$ and from 0.01% by weight (wt. %) to 10 wt. % of a $CO_2$ soluble alkoxylate surfactant based on the total weight of $CO_2$, a mixture comprising 10 vol % or less of $CO_2$, from 0.01 wt. % to 10 wt. % of the $CO_2$ soluble alkoxylate surfactant based on the total weight of $CO_2$, and an aqueous carrier fluid, or both; and
a dispersing unit configured to form a dispersion comprising microbubbles, nanobubbles, or both from the mixture, wherein the dispersing unit is in fluid communication with the injection unit and the injection well.

14. The system of claim 13, wherein the system is configured to produce a natural fluid from the formation.

15. The system of claim 13, wherein the $CO_2$ soluble alkoxylate surfactant is a nonionic alkoxylate surfactant, and wherein the $CO_2$ soluble surfactant has a general structure of R—(PO)x-(EO)y, where R is a linear or branched hydrocarbon chain having from 4 to 30 carbons, PO is propylene oxide, EO is ethylene oxide, x is in a range from 1 to 50, and y is in a range from 1 to 50.

16. The system of claim 13, wherein the surfactant is present in the mixture in a range from 0.1 wt. % to 1 wt. % based on the total weight of $CO_2$.

17. The system of claim 13, wherein the dispersing unit is a high shear mixer, an infrasonic unit, an acoustic unit, an ultrasonic unit, or combinations thereof.

18. The system of claim 13, wherein the dispersing unit is located in a coiled tubing located in the injection well such that the dispersing unit is configured to form the dispersion in a downhole location of the injection well.

19. The system of claim 13, wherein the dispersing unit is located at a surface location of the formation.

20. The system of claim 13, wherein the system is configured to operate while the formation is undergoing water flood treatment.

\* \* \* \* \*